United States Patent
Blum

(10) Patent No.: US 9,073,617 B2
(45) Date of Patent: Jul. 7, 2015

(54) PIPELINE SYSTEM AND BALLAST WATER TREATMENT SYSTEM USING SAME

(76) Inventor: Holger Blum, Teufen (CH)

( * ) Notice: Subject to any disclaimer, the term of this patent is extended or adjusted under 35 U.S.C. 154(b) by 478 days.

(21) Appl. No.: 13/583,897

(22) PCT Filed: Mar. 9, 2011

(86) PCT No.: PCT/EP2011/053511
§ 371 (c)(1),
(2), (4) Date: Nov. 27, 2012

(87) PCT Pub. No.: WO2011/110578
PCT Pub. Date: Sep. 15, 2011

(65) Prior Publication Data
US 2013/0081988 A1    Apr. 4, 2013

(30) Foreign Application Priority Data
Mar. 9, 2010    (DE) ............... 20 2010 000 339 U

(51) Int. Cl.
| | |
|---|---|
| *B63J 4/00* | (2006.01) |
| *C02F 1/50* | (2006.01) |
| *C02F 1/66* | (2006.01) |
| *F17D 1/08* | (2006.01) |
| *C02F 1/28* | (2006.01) |
| *C02F 103/00* | (2006.01) |

(52) U.S. Cl.
CPC .   *B63J 4/002* (2013.01); *C02F 1/50* (2013.01);
*F17D 1/08* (2013.01); *C02F 1/283* (2013.01);
*C02F 1/66* (2013.01); *C02F 2103/008*
(2013.01); *C02F 2303/04* (2013.01)

(58) Field of Classification Search
CPC .............. B63J 4/002; F17D 1/08; C02F 1/50;
C02F 1/283; C02F 1/66; C02F 2103/008;
C02F 2303/04
See application file for complete search history.

(56) References Cited

U.S. PATENT DOCUMENTS

| | | |
|---|---|---|
| 2005/0016933 A1 | 1/2005 | Perlich et al. |
| 2008/0164217 A1 | 7/2008 | Nishizawa et al. |

FOREIGN PATENT DOCUMENTS

| | | |
|---|---|---|
| DE | 4326575 A1 | 2/1995 |
| DE | 202007004912 U1 | 7/2007 |
| DE | 202009007693 U1 | 8/2009 |

OTHER PUBLICATIONS

English translation of DE 202009007693U1 to Blum, Holger, Aug. 2009. (obtained from espacenet Feb. 2015).*
International Preliminary Report on Patentability for PCT Application No. PCT/EP2011/053511 dated Oct. 4, 2012.
International Search Report for PCT/EP2011/053511 dated May 25, 2011.

* cited by examiner

*Primary Examiner* — Lucas Stelling
(74) *Attorney, Agent, or Firm* — Nixon Peabody LLP; Joseph Bach, Esq.

(57) ABSTRACT

The invention relates to a pipeline system for transporting a biocide solution from a reactor device (1) for generating biocide solution to a treatment device (5) for introducing the biocide solution into a ballast water flow in a ballast water line (92, 94) having a transport line system (11, 42, 54) between the reactor device (1) and the treatment device (5) of the ballast water treatment system. The invention is characterized by a pressurized water line system (8, 44) connecting a pressurized water source (2) to the transport line system (11, 42, 54) at the connection thereof to the reactor device (1), and by a flush water line system (9, 30, 40) connected to the transport line system (11, 42, 54) at the connection thereof to the treatment device (5).

16 Claims, 2 Drawing Sheets

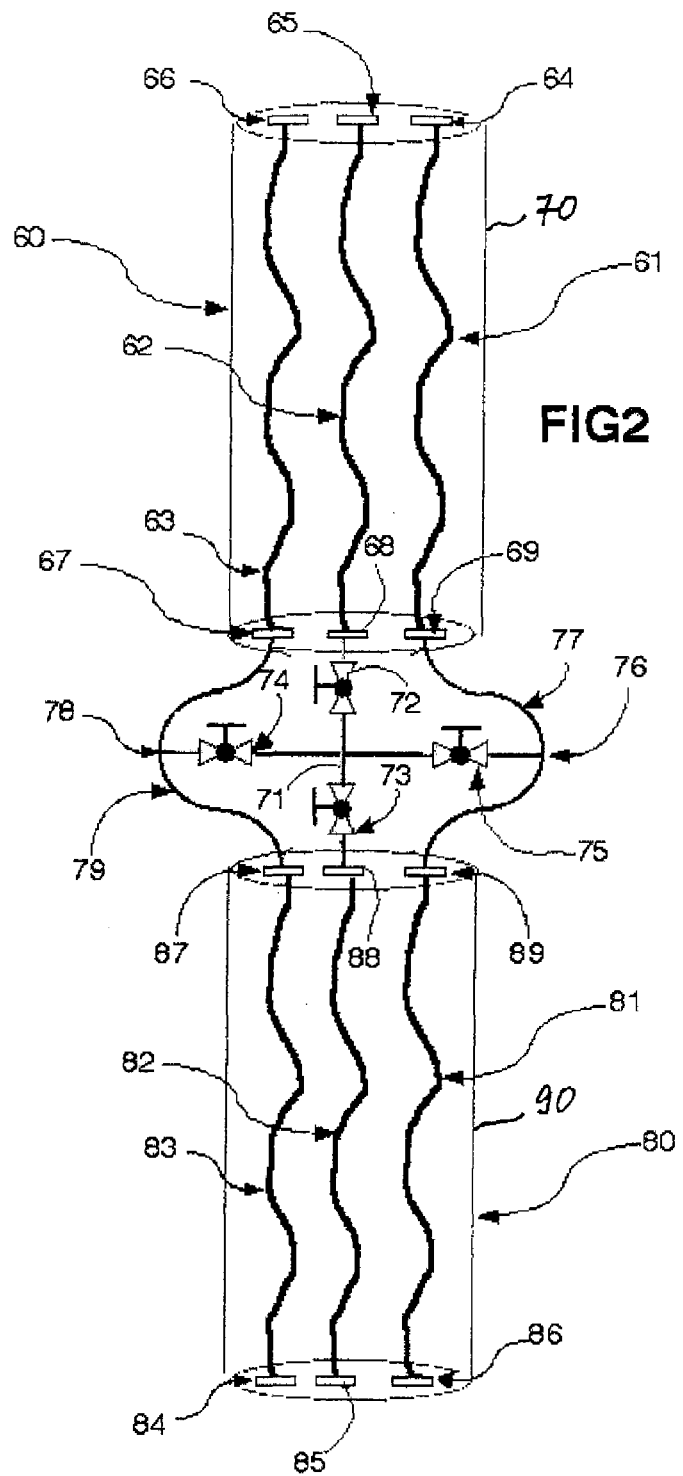

PIPELINE SYSTEM AND BALLAST WATER TREATMENT SYSTEM USING SAME

RELATED APPLICATIONS

Figure 1:
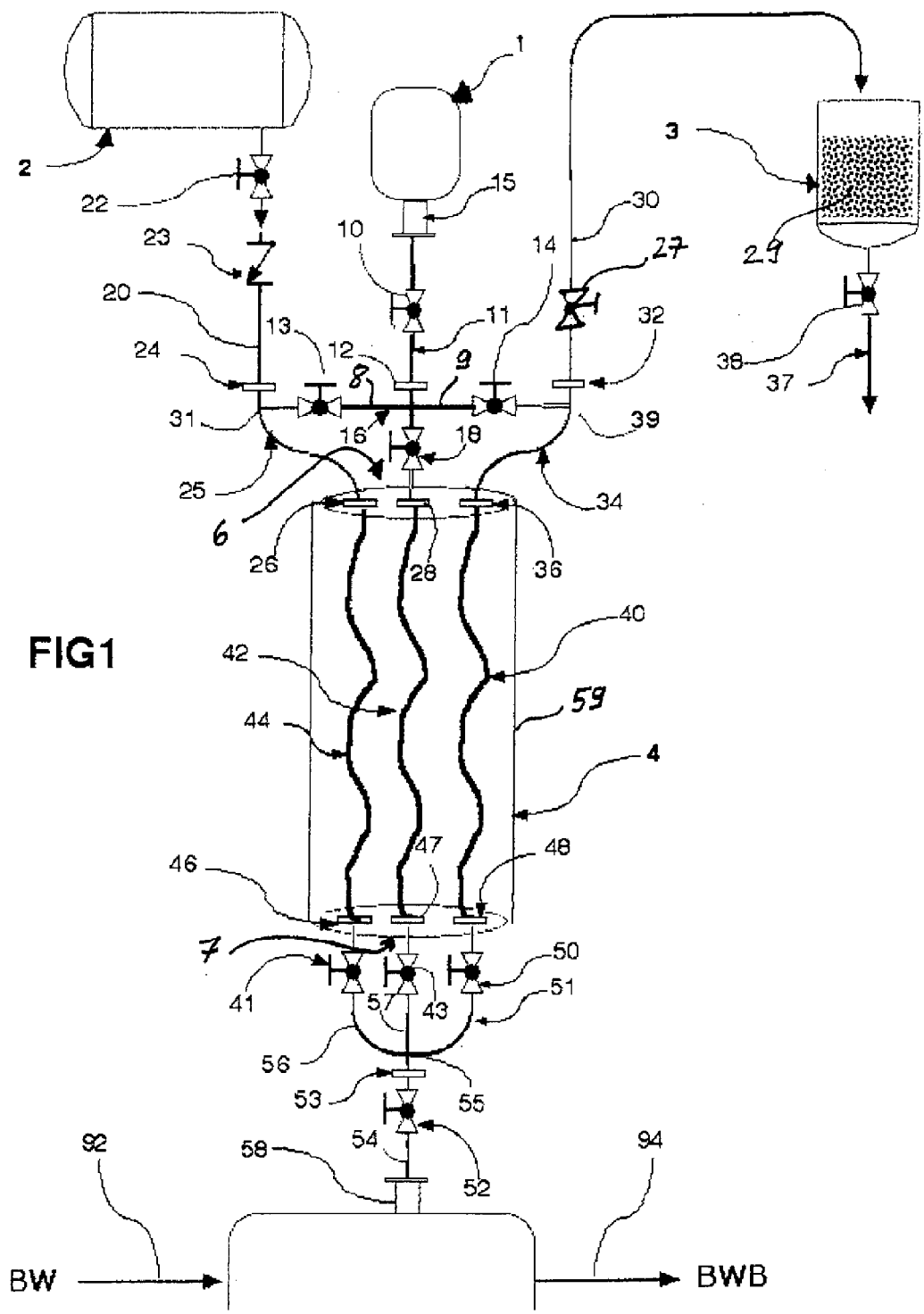

This application is a National Phase of International Application No. PCT/EP2011/053511, entitled "PIPELINE SYSTEM AND BALLAST WATER TREATMENT SYSTEM USING SAME", which was filed on Mar. 9, 2011, and which claims priority of German Patent Application No. 20 2010 000 339.3, filed on Mar. 9, 2010, and the disclosures of which are hereby incorporated by reference herein in their entirety.

The invention relates to a pipeline system for transporting a biocide solution from a reactor device for generating biocide solution to a treatment device for introducing the biocide solution into a ballast water flow in a ballast water line having a transport line system between the reactor device and the treatment device of the ballast water treatment system.

It is already known that ballast water on ships can be disinfected by using biocides. Acrolein is particularly suited as biocide. Already by adding 5 to 15 ppm acrolein to the ballast water, bacteria, algae, zebra-mussels and other organisms of the zooplankton can be mortified, and, thereby, the transfer from one port to another can be prohibited with certainty. Aqueous solutions of acorlein are not poisonous and may be handled safely, however, the stability of such solutions amounts to a few days only so that the usage on ships is impossible because of logistic problems.

A device is known from DE-GM 20 2007 004 912 in which the ballast water is pumped by means of a pressure rising pump through a water jet pump, and the negative pressure zone of the water jet pump is hydraulically connected through a control valve to a reaction container which comprises separate, external inflow openings for acrolein acetal, acid and hydrolysis water. An aqueous acrolein solution is generated in the reactor container which solution is not poisonous and may be handled safely. The acrolein solution is mixed to the ballast water in the water jet pump such that the organisms in the ballast water are mortified by the acrolein. This device comprises a pipeline for transporting the acrolein solution from the reaction container for generating acrolein solution to the device for introducing the acrolein solution into the ballast water flow. In such ballast water treatment systems, the reactor device is preferably arranged on deck for example in the vicinity of the bridge, while the device for introducing the biocide solution into the ballast water, i.e. the actual ballast water treatment device, is located in the hulk of the ship at the ballast water line. Therefore, care has to be taken that the reactor device and the treatment device are connected by a pipeline system, which is safe on the stretch between the reactor device and the ballast water treatment device and which may be serviced with low effort.

Therefore, it is an object of the invention, to provide such a pipeline system as well as a ballast water treatment system using such a pipeline system which meets the above-mentioned requirements.

For achieving the object, the pipeline system of the invention is characterized by a pressurized water line system which connects a pressurized water source with the transport line system at the connection thereof to the reactor device, and by a flush water line system connected to the transport line system at the connection thereof to the treatment device. By means of this implementation of the pipeline system, the transport line system of the ballast water treatment system may be cleaned in a simple way after having finished taking up ballast water with a concurrent treatment of the ballast water thereby that pressurized water is conveyed through the respective portions of the pressurized water line system into the transport line system and, from there, through the flush water line system.

For achieving the object, the pipeline system according to the invention of the kind mentioned above, as an alternative to the above solution of the pipeline system or in addition to the above pipeline system, is characterized by a pressurized water line system connected to the transport line system at the connection thereof to the treatment device and by a flush water line system connected to the transport line system at the connection thereof to the reactor device. In case such a pipeline system is used as an alternative to the above-mentioned pipeline system, the transport line system may be rinsed opposite to the operational flow direction of the biocide solution in the above-mentioned ballast water treatment, with pressurized water thereby that the pressurized water is flown through the pressurized water line system to the end of the transport line system at the treatment device, from there, opposite to the normal flow direction of the biocide solution through the transport line system, and, from there, it is discharged through the flush water line system. In case the present pipeline system is provided in addition to the above characterized pipeline system, the transport line system may be rinsed with pressurized water in the normal flow direction of the biocide solution as well as opposite to the normal flow direction of the biocide solution so that, in an advantageous way, all components in these pipelines like pipe couplings, valves and the like, are rinsed in the transport line system in both directions so that no residues remain in these components.

According to an advantageous embodiment of the invention, the pipeline system is characterized by a first pipe crosspiece having shut-off valves at the reactor device which connects the transport line system and/or the pressurized water line system and/or the flush water line system with each other, and by a second pipe crosspiece having shut-off valves at the treatment device which also connects the transport line system and/or the pressurized water line system and/or the flush water line system with each other. By means of such pipe crosspieces having shut-off valves, the various flow paths for the pressurized water, the biocide solution and the flush water may be controlled in an easy way, in particular when the shut-off valves are valves which are actuated from a control panel, for example electromagnetic valves.

According to a further advantageous embodiment of the invention, the pipeline system is characterized by a shut-off valve in a pipeline between the second pipe crosspiece and the treatment device. By means of this valve, the treatment device may be separated, in an advantageous way, from the pipeline system and the rest of the ballast water treatment system so that maintenance and cleaning works can be carried out without intruding into the ballast water line system.

According to a further advantageous embodiment of the invention, the pipeline system is characterized by a shut-off valve in a pipeline portion of the flush water line system between the first pipe crosspiece and a neutralizing device. By means of the shut-off valve in cooperation with the switching of the above-mentioned shut-off valves, the biocide solution can, if necessary, be bypassed through the flush water line system to the ballast water treatment device if the supply line portion of the transport line system is blocked, whereby an additional redundancy is resulting for the flow path of the biocide solution in an advantageous way.

Finally, it is advantageous with such a pipeline system that, in case the transport line system for the biocide solution should be blocked, the pressurized water line system may be alternatively used for feeding the biocide solution from the reactor device to the ballast water treatment device which is a further step to an advantageous redundancy of the pipeline system.

According to a further advantageous embodiment of the invention, the pipeline system is characterized in that the neutralizing device comprises a container filled with a neutralizing agent, preferably activated carbon or chalk, which is a simple and effective method in order to reduce even a small odor exposure by the biocide.

According to a further advantageous embodiment of the invention, the pipeline system is characterized by a shut-off valve in a pipeline portion of the pressurized water system between the first pipe crosspiece and the pressurized water source whereby a security measure is provided against an unintended flow of pressurized water into the pipeline system.

According to a further advantageous embodiment of the invention, the pipeline system is characterized by a check valve arranged in flow direction after the shut-off valve in the pipeline portion of the pressurized water system between the first pipe crosspiece and the pressurized water supply whereby it is prevented that solution from the reactor can reach the pressurized water tank.

According to a further advantageous embodiment of the invention, the pipeline system is characterized in that the transport line system and/or the pressurized water line system and/or the flush water line system are combined to a multi-channel pipeline whereby an effective and easily accessible installation of the pipeline system is possible.

According to a further advantageous embodiment of the invention, the pipeline system is characterized in that the multi-channel pipeline is arranged in a protective pipe whereby the pipeline system is protected against external influences and a possibly rough environment on a ship, in particular when the protective pipe comprises a pipe amour, preferably a steel pipe amour.

According to a further advantageous embodiment of the invention, the pipeline system is characterized in that the multi-channel pipe comprises flexible pipes. Thereby, the installation of the pipeline system in the surroundings of a ship is made possible in an advantageous way and suited to the requirements.

According to a further advantageous embodiment of the invention, the pipeline system is characterized by segmenting the multi-channel pipe by means of at least one pipe crosspiece with shut-off valves. In particular, when the pipeline system exceeds a certain length between the reactor device and the treatment device, it is advantageous to segment the pipeline system. Thereby, the further advantage is resulting that maintenance and repair works are possible at the individual pipes of a segment without endangering the functionality of the complete system.

For solving the object, there is finally provided a ballast water treatment system comprising a reactor device for generating biocide solution, a treatment device for introducing the biocide solution into a ballast water flow in the ballast water line, a pressurized water tank for supplying pressurized water to the system and a neutralizing device for neutralizing biocide solution produced during rinsing of the system, and a pipeline system of the above-mentioned kind according to one of the proceeding claims. The advantages of such a ballast water treatment water system show up in particular when the feeding of the biocide solution from the reactor device to the treatment device is affected through overpressure or a Venturi nozzle, respectively, because, in such a case, an economic cleaning of the pipeline system would be difficult without a pressurized water tank.

Embodiments of the invention are now described with reference to the enclosed drawings.

FIG. 1 shows a schematic diagram of a ballast water treatment system with an embodiment of the pipeline system of the invention; and FIG. 2 is a modified embodiment of the pipeline system with pipeline segments.

In FIG. 1, a ballast water treatment system is shown which comprises a reactor device 1 for generating biocide solution, a treatment device 5 for introducing the biocide solution into a ballast water flow in a ballast water line 92, 94, a pressurized water tank 2 for supplying the system with pressurized water and a neutralizing device 3 comprising a container filled with neutralizing agent, for example activated carbon or chalk, for neutralizing biocide solution being produced during cleaning of the system. These components of the ballast water treatment system are connected to each other by a pipeline system which comprises a multi-channel pipeline 4 having an input end 6 and an output end 7 and pipelines which may be connected to or separated from the components of the ballast water treatment system.

A transport line portion 11, as a tube line, having an shut-off valve 10 leads from an output flange 15 of the reactor device 1 to a pipe coupling 12 which is connected to one arm of a first pipe crosspiece 16 having four arms. The three other arms of the pipe crosspiece 16 are connected through shut-off valves 13, 14 and 18 with T-pieces 31, 39 and a pipe coupling 28. One arm of the crosspiece 16 with the shut-off valve forms a pressurized water pipe portion 8, and another arm with the shut-off valve 14 forms a flush water portion 9. Therefore, the transport line system is formed by the transport line portion 11, the transport line portion 42 and the transport line portion 54. The crosspiece 16 is located at an input end 6 of a multi-channel pipeline 4 comprising the transport line portion 42, the pressurized water line portion 44 and the flush line portion 40.

Connected to a pipe coupling 28 is a transport line portion 42 which is connected through the pipe coupling 47 with the straight arm 57 of the second pipe crosspiece 55. The straight arm 57 of the pipe crosspiece 55 contains a shut-off valve 43. The two other arms of the pipe crosspiece 55 are formed as pipe bends 51 and 56 and contain shut-off valves 41 and 50. One arm of the pipe crosspiece 55 is connected through a pipe coupling 53 to the pipe stub 54 which is formed as a short portion of pipeline and contains a shut-off valve 52. The pipe stub 54 is connected again to an inflow flange 58 of the treatment device 5. The treatment device 5 comprises, in addition to the input flange 58, at least one input line 92 for ballast water BW as well as a drainage line 94 for ballast water BWB treated with biocide solution.

The pressurized water tank 2 is connected through a pressurized water line portion 20 containing a shut-off valve 22 and a check valve 23, through a pipe coupling 24 to a T-piece 31. The T-piece 31 is itself connected through a shut-off valve 13 to the supply line portion 11 between the pipe coupling 12 and the valve 18, and, on the other hand, through pipe coupling 26 to the pressurized water line portion 44. The pressurized water line portion 44 is connected through a pipe coupling 46 to one arm 56 of the pipe crosspiece 51 and a shut-off valve 43 in another arm 57 of the pipe crosspiece 51 through a pipe coupling 47 to the supply line portion 42 at an output end 7 of the multi-channel pipe 4. The pressurized water line portion 44 is, furthermore, connected through a further arm 51 of the pipe crosspiece 51 and a shut-off valve 50 in the other arm 57 of the pipe crosspiece 51 to a pipe coupling 48 at the flush line portion 40. The pressurized water line system is, thereby, formed by the pressurized water line portion 20, the pressurized water line portion 44 and the pressurized water line portion 8.

The flush line portion 40 is connected through a further T-piece 39 and a pipe coupling 32 to a flush line portion 30 which leads to the neutralizing device 3. In the drainage line 37 of the neutralizing device 3, there is also provided a shut-off valve 38. The flush line portion 9 leads through the T-piece 39 to a pipe coupling 32 which is connected through a shut-off valve 27 in the flush line portion 30 to the neutralizing device 3. Thereby a flush water line system is formed by the flush line portion 9, the flush line portion 30 and the flush line portion 40.

The transport line portion 42, the pressurized water line portion 44 and the flush line portion 40 are arranged in a protective pipe 59 which embraces the three lines and is a protection against external influences. Preferably, the protective pipe 59 is open at both ends. The protective pipe may have a closed surface or may have through holes or a grid-like structure having break through portions. Also an amour, preferably a steel amour, is advantageous. The diameter of the protective pipe has such a size that individual lines which are arranged therein can be extracted easily. In another embodiment, the protective cover is formed by two half shells which may be separated from each other.

In FIG. 2 a modified embodiment of the pipeline system is shown. In case a local situation does not allow embodying the multi-channel pipeline in one piece, the multi-channel pipeline is carried out in segments. Accordingly, in FIG. 2 there are shown a first pipeline portion 60 with a transport line portion 62 provided therein, a pressurized water line portion 63 and a flush line portion 61 as well as a further pipeline portion 80 and a transport line portion 82 arranged therein, a pressurized water line portion 83 and a flush line portion 81. The pipes in the first pipeline portion 60 are enclosed in a protective pipe 70, and the pipes in the second pipeline portion 80 are contained in a protective pipe 90.

The two pipeline portions 60, 80 are connected to each other through a pipe crosspiece 71 and T-pieces 76, 78. Pipe couplings 66, 65 and 64 as well as 67, 68, 69 are connected to the respective pipes as is shown in FIG. 2. The pipe crosspiece 71 and the T-pieces 76, 78 form the connection of the upper pipeline portion 60. Further pipe couplings 87, 88, 89 are connected each to pipes as is shown in FIG. 2 and form the connection with the lower pipe line portion 80. Further pipe coupling 86, 85 and 84 at the lower end of the pipeline portion 80 serve for connecting a further pipeline portion or as connection to the treatment device.

Two oppositely arranged arms of the pipe crosspiece 71 are connected through shut-off valves 72 and 73 to the pipe couplings 68 and 88 and form the connection of the transport line portions 62, 82 of the first and second pipe segments 60 or 80, respectively. The two other oppositely arranged arms of the pipe crosspiece 71 are connected through shut-off valves 74 and 75 to the T-pieces 76 and 78. The T-piece 78 is arranged in the center of a double-S-bend pipe 79. The double-S-bend pipe 79 couples, through the pipe couplings 67 and 87, the pressurized water line portions 63 and 83 of the upper and lower pipe segments, respectively. The T-piece 76 is arranged in the center of the double-S-bend pipe 77. The double-S-bend pipe 77 couples the pipe couplings 69 and 89 the rinsing line portions 61 and 81 of the upper and lower pipe segments, respectively.

In the following, the various operations of the systems are described.

A) Supply Operation

The biocide solution generated in the reactor device 1 flows through the output flange 15 into the transport line portion 11 upon the shut-off valve being open. In supply operation, the shut-off valves 13 and 14 are closed, and the shut-off valve 18 is open. Therefore, the biocide solution flows into the transport line portion 42 and enters the straight arm 57 of the pipe crosspiece 55 from the transport line portion 42 through the pipe coupling 47.

The straight arm 57 of the pipe crosspiece 55 contains the shut-off valve 43 which is open during supply operation. During supply operation, the shut-off valves 41 and 50 are closed. Therefore, the biocide solution flows into the pipe stub 54 through the fourth arm of the pipe crosspiece 55. In the supply operation, the shut-off valve 52 is open, and, therefore, the biocide solution flows into the input flange 58 of the treatment device 5.

B) Rinsing after Operation

After finishing the supply operation, the shut-off valve 10 is closed. The shut-off valve 13 in the pipe crosspiece 16 is opened, whereby the access to the T-piece 31 is allowed. Water from the pressurized water tank 2 flows, upon the shut-off valve 22 is being opened, through the check valve 23 into the pressurized water line portion 20 which is connected to the T-piece 31 through a pipe coupling 24. Preferably, the shut-off valve 22 is always open so that the pipe 20 is always filled with pressurized water.

By closing the shut-off valve 10 and opening the shut-off valve 13, water flows through the opened shut-off valve 18 in the transport line portion 42 and through the opened shut-off valves 43 and 54 into the input flange 58 of the treatment device 5. All lines and armatures of the device of the invention following the shut-off valve 10 are, therefore, cleaned from biocide solution and are filled with water from the pressurized water tank 2.

C) Interruption of Operation (Counter Current Flow and Direct Current Flow Rinsing)

Because biocide solution, in particular acrolein solution, is lasting only for a limited period of time, the transport eed line portion 42 and the pipe crosspieces 16 and 55 have to be cleaned thoroughly in case of an interruption of operation or in case repairs have to be made on the device of the invention.

In case, based on a disturbance in operation, the supply of the biocide solution into the input flange 58 of the device 5 has to be interrupted, this is done by closing the shut-off valve 10 and the shut-off valve 52.

Thereafter, the shut-off valve 41 and the shut-off valve 14 are opened. The shut-off valve 13 and 50 remain closed; the shut-off valves 18 and 43 remain open. Therefore, pressurized water flows from the T-piece 31 through the S-bend pipe 25 through the pipe coupling 26 into the pressurized water line portion 44 and enters through the pipe coupling 46 and through the shut-off valve 41 into the one bend pipe 56 of the pipe crosspiece 55. Because the shut-off valve 50 is closed and the shut-off valve 43 is open the pressurized water reaches the transport line portion 42 through the pipe coupling 47 opposite to the supply direction and pushes the biocide solution contained therein out through the opened valve 14 and through the pipe coupling 32 into the flush line portion 30.

Subsequently thereto, the shut-off valves 41 and 14 are closed. The shut-off valves 13 and 50 are opened. Therefore, the pressurized water flows concurrent with the original transport direction through the opened shut-off valve 18 through the pipe coupling 28 into the transport line portion 42 and flows through the pipe crosspiece 55 and the bend pipe 51 and the pipe coupling 48 into the flush line portion 40.

Since the flush line portion 40 is connected by means of the pipe coupling 36 to the S-bend pipe 34 which is also connected to one leg of the T-piece 38, the flush water flows through the pipe coupling 32 into the flush line portion 30.

After finishing the neutralizing process, the neutralized water may be drained from time to time through the opened shut-off valve 38 into the drainage line 37.

D) Operation with Segmented Pipeline

In the normal case, the shut-off valves 74 and 75 are closed, and the shut-off valve 72 and 73 are open so that the pipe crosspiece 71 connects the upper three pipes with the lower three pipes of the same kind.

Because of the arrangement of the pipe crosspiece with the four shut-off valves 72, 73, 74 and 75 and the connection thereof to the double-S-bend pipes 77 and 79, the transport line portion for the biocide solution in each pipe segment can be cleaned and rinsed as described above in a concurrent flow or a flow opposite thereto individually or as a group of segments.

By segmenting the pipeline system, individual pipes may be removed without disturbance of the system and without a dangerous operational state being generated, if necessary.

The invention claimed is:

1. A pipeline system for transporting a biocide solution from a reactor device for generating biocide solution to a treatment device of a ballast water treatment system for introducing the biocide solution into a ballast water flow in a ballast water line comprising:
   a transport line system having a connection to the reactor device and having a connection to the treatment device of the ballast water treatment system,
   a pressurized water line system connecting a pressurized water source to the transport line system at the connection of the transport line system to the reactor device at a first pipe crosspiece, and
   a flush water line system connected to the transport line system at the connection of the transport line system to the treatment device at a second pipe crosspiece,
   the first pipe crosspiece having a first plurality of shut-off valves, the first pipe crosspiece connecting the reactor device, the transport line system, the pressurized water line system, and the flush water line system with each other, and
   the second pipe crosspiece having a second plurality of shut-off valves, the second pipe cross piece connecting the treatment device, the transport line system, the pressurized water line system, and the flush water line system with each other.

2. The pipeline system according to claim 1, wherein the second plurality of shut-off valves comprises a shut-off valve in a pipeline between the second pipe crosspiece and the treatment device.

3. The pipeline system according to claim 1, wherein the first plurality of shut-off valves comprises a shut-off valve in a pipeline portion of the flush water pipe system between the first pipe crosspiece and a neutralizing device.

4. The pipeline system according to claim 3, wherein the neutralizing device comprises a container filled with a neutralizing agent.

5. The pipeline system according to claim 1, wherein the first plurality of shut-off valves comprises a shut-off valve in a pipeline portion of the pressurized water line system between the first pipe crosspiece and the pressurized water source.

6. The pipeline system according to claim 5, comprising a check valve arranged in flow direction after the shut-off valve in the pipeline portion of the pressurized water line system between the first pipe crosspiece and the pressurized water source.

7. The pipeline system according to claim 1, wherein a portion of the transport line system, a portion of the pressurized water line system, and a portion of the flush water line system are combined in a multi-channel pipeline.

8. The pipeline system according to claim 7, comprising at least one additional pipe crosspiece with an additional plurality of shut-off valves between segments of the multi-channel pipe.

9. A ballast water treatment system comprising:
   a reactor device for generating biocide solution,
   a treatment device for introducing the biocide solution tin a ballast water flow in the ballast water line,
   a pressurized water tank for supplying pressurized water to the ballast water treatment system,
   a neutralizing device for neutralizing biocide solution produced during rinsing of the system,
   a pipeline system comprising:
      a transport line system having a connection to the reactor device and having a connection to the treatment device of the ballast water treatment system,
      a pressurized water line system connecting the pressurized water tank to the transport line system at the connection of the transport line system to the reactor device at a first pipe crosspiece,
      a flush water line system connected to the transport line system at the connection of the transport line system to the treatment device at a second pipe crosspiece,
      the first pipe crosspiece having a first plurality of shut-off valves, the first pipe crosspiece connecting the reactor device, the transport line system, the pressurized water line system, and the flush water line system with each other, and
      the second pipe crosspiece having a second plurality of shut-off valves, the second pipe cross piece connecting the treatment device, the transport line system, the pressurized water line system, and the flush water line system with each other.

10. The ballast water treatment system according to claim 9, wherein the second plurality of shut-off valves comprises shut-off valve in a pipeline between the second pipe crosspiece and the treatment device.

11. The ballast water treatment system according to claim 9, wherein the first plurality of shut-off valves comprises a shut-off valve in a pipeline portion of the flush water pipe system between the first pipe crosspiece and the neutralizing device.

12. The ballast water treatment system according to claim 11, wherein the neutralizing device comprises a container filled with a neutralizing agent.

13. The ballast water treatment system according to claim 9, wherein the first plurality of shut-off valves comprises a shut-off valve in a pipeline portion of the pressurized water line system between the first pipe crosspiece and the pressurized water tank.

14. The ballast water treatment system according to claim 13, comprising a check valve arranged in flow direction after the shut-off valve in the pipeline portion of the pressurized water line system between the first pipe crosspiece and the pressurized water source.

15. The ballast water treatment system according to claim 9, wherein a portion of the transport line system, a portion of the pressurized water line system, and a portion of the flush water line system are combined in a multi-channel pipeline.

16. The ballast water treatment system according to claim 15, comprising at least one additional pipe crosspiece with an additional plurality of shut-off valves between segments of the multi-channel pipe.

* * * * *